Oct. 3, 1950
J. G. CADUFF
2,524,160
AIR CONDITIONING AND HEATING APPARATUS
Filed Oct. 1, 1945
2 Sheets-Sheet 1
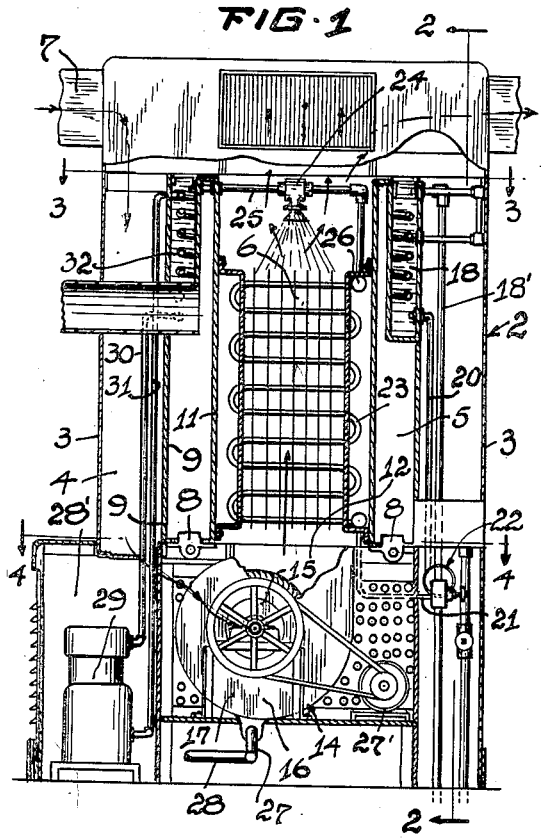
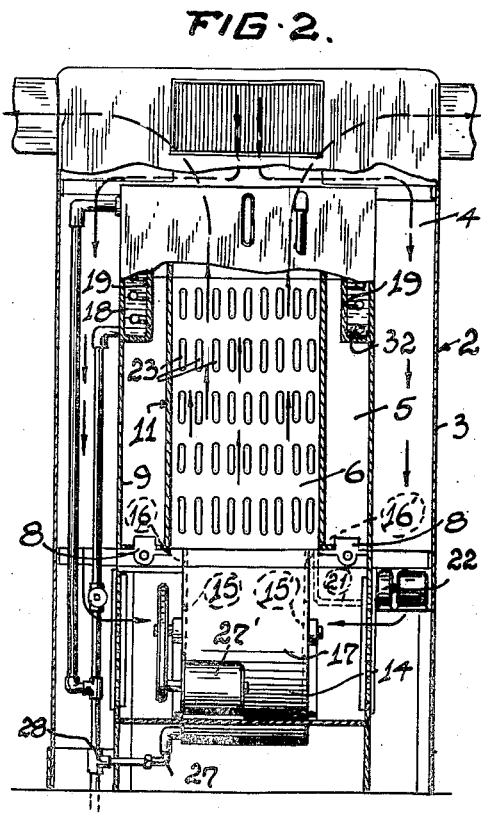
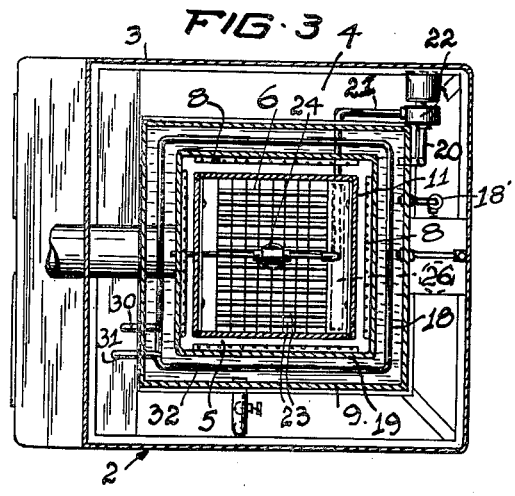
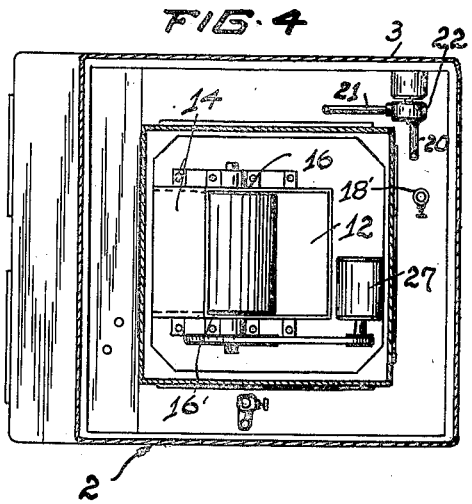
INVENTOR.
BY JOHN G. CADUFF
Gustav A. Wolff
ATT

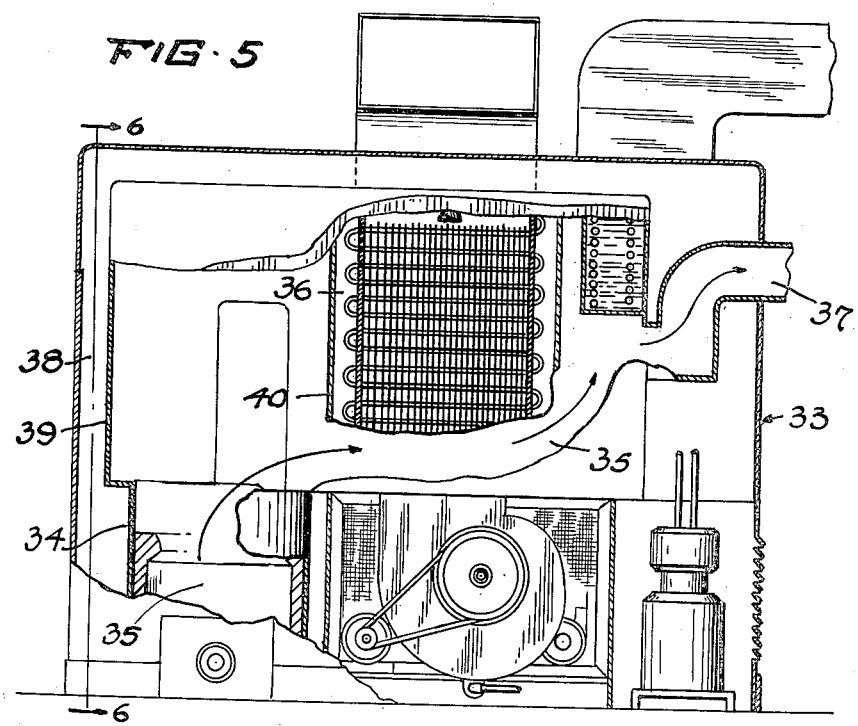
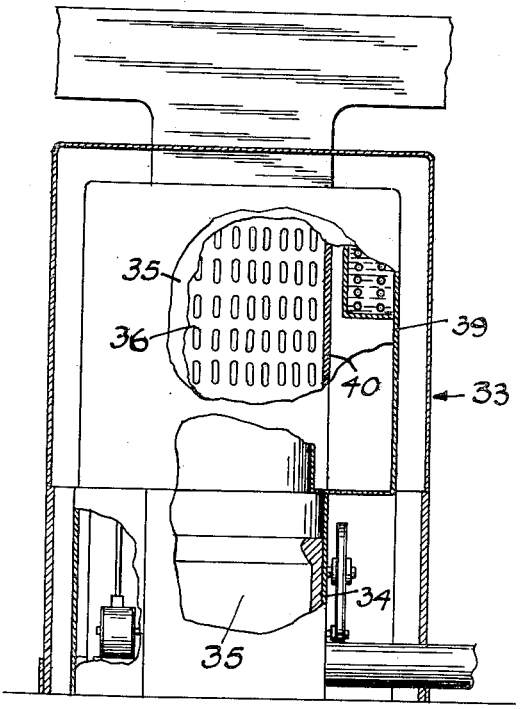

Patented Oct. 3, 1950

2,524,160

UNITED STATES PATENT OFFICE 2,524,160

AIR-CONDITIONING AND HEATING APPARATUS

John G. Caduff, Cleveland, Ohio

Application October 1, 1945, Serial No. 619,600

6 Claims. (Cl. 261—9)

This invention relates in general to air conditioning apparatus and, more particularly, to combined air conditioning and heating apparatus and has for its general object the provision of combined air conditioning and heating apparatus of simple, durable and compact design, of high efficiency and comparatively inexpensive construction.

The efficiency of combined air conditioning and heating apparatus is generally controlled by the ratio of heat transferred to the air circulating through the apparatus, and this ratio is proportionate to the heat contact area of the apparatus.

Another object of the present invention therefore is the provision of a combined air conditioning and heating apparatus with sufficient heat contact areas by arranging heating and air conditioning means within each other and including primary and secondary heating means interrelated with the air conditioning means for efficient transfer of heat energy to the air circulating through the apparatus.

A further object of the invention is the provision of a combined air conditioning and heating apparatus with air washing means, and primary and secondary heating means, in which apparatus part of the secondary heating means are arranged within the air washing means for highest efficiency in heat transfer to the air circulating through the apparatus.

Combined air conditioning and heating apparatus of the type described above can be used for all year air conditioning by providing these apparatus with means adapted to cool the air circulating therethrough.

A still further object of the invention therefore is the provision of a combined air conditioning and heating apparatus with air washing means, primary and secondary heating means with part of the secondary heating means arranged within the air washing means, and cooling means interrelated with the secondary heating means for cooperating therewith in effecting all year temperature control of air circulating through the apparatus.

With the above and other incidental objects in view, the invention has certain other marked superiorities which radically distinguish it from presently known structures. These improvements or superior characteristics embodying certain novel features of construction are clearly set forth in the following specification and the appended claims; and several preferred forms of embodiment of the invention are hereinafter shown with reference to the accompanying drawings forming part of the specification.

In the drawings:

Fig. 1 is a vertical longitudinal sectional view through an all year combined air conditioning and heating apparatus constructed in accordance with the invention;

Fig. 2 is a sectional view, partly in elevation, of the apparatus shown in Fig. 1, the section being taken on line 2—2 of Fig. 1;

Fig. 3 is a horizontal sectional view through the apparatus shown in Fig. 1, the section being taken on line 3—3 of Fig. 1;

Fig. 4 is a horizontal sectional view through the apparatus shown in Fig. 1, the section being taken on line 4—4 of Fig. 1;

Fig. 5 is a longitudinal sectional view, partly in elevation, of a somewhat modified form of an all year combined air conditioning and heating apparatus constructed in accordance with the invention; and Fig. 6 is a sectional view, partly in elevation, of the apparatus shown in Fig. 5, the section being taken on line 6—6 of Fig. 5.

Referring now to the exemplified form of the invention shown in Figs. 1 through 4 of the drawings, reference numeral 2 denotes an all year air conditioning and heating apparatus, the substantially rectangularly shaped cabinet 3 of which is subdivided into an air preheating chamber 4, a heating and combustion chamber 5, and an air washing chamber 6. Air preheating chamber 4 communicates at its top end with an air intake passage 7 and encircles combustion chamber 5 having arranged therein gas burners 8. Chambers 4 and 5 are separated from each other by a common wall 9 for proper heat transfer from combustion chamber 5 to air preheating chamber 4. The combustion chamber 5 has a vertical central through-passage, which passage forms air washing chamber 6, so that this latter chamber and combustion chamber 5 are separated by a common wall 11 permitting also proper heat transfer from combustion chamber 5 to air washing chamber 6. The bottom portion of air washing chamber 6 communicates with the outlet passage 12 of a blower 14 of the so-called squirrel cage type, which blower is mounted below chamber 6 and communicates with preheating chamber 4 by inlet passages 15, 15' centrally arranged in the opposite side walls 16, 16' of blower housing 17.

Combustion chamber 5 has arranged in its top portion a water tank 18 which encircles the upper portion of chamber 6, has its outer wall formed by wall 9 and its inner wall 19 spaced from wall 11. Tank 18 is coupled by pipes 20, 21 with a pump 22 effecting circulation of water through said tank and through a plurality of coils 23 arranged in air washing chamber 6. A water spray 24 arranged in pipe line 25 connecting tank 18 with header 26 for coils 23 jets washing water into air washing chamber 6, which water, when used, drops by gravity through outlet 12 into blower housing 17 and thence through a passage in said housing and a pipe connection 27 into waste pipe line 18. Tank 18, as shown, is connected by a valve controlled pipe line 18' with a source of water supply (such as a city water line), not shown, which pipe line permits feeding of water into tank 18 whenever necessary.

The described relationship of the three chambers of the air conditioning and heating apparatus (preheating chamber, combustion chamber and air washing chamber) permits proper heating of the air circulating through the apparatus, as such air is subsequently exposed to walls 9 and 11 which separate combustion chamber 5 from preheating chamber 4 and air washing chamber 6. Air circulating through the apparatus is additionally exposed to a secondary heating member, tank 18, which is arranged in combustion chamber 5 and directly heated by combustion gases of gas burners 8 and which transmits stored heat energy through wall 9 into preheating chamber 4 and through pipe line 25, header 26 and coils 23 into air washing chamber 6. Such air, when passing through air washing chamber 6, is contacted by a spray of heated water to avoid losses of heat energy previously transferred to the air in preheating chamber 4 and air washing chamber 6.

In operation, the described air conditioning and heating apparatus by means of blower 14, driven by a motor 27', draws air to be heated and conditioned through the preferably filtered intake passage 7 into the chamber 4, hence through the inlet passages 15, 15' into the blower and through outlet passage 12 into and through air washing chamber 6. During this travel the air is subjected to preheating, centrifugal action, a primary soaking and washing action by heated water, further heating by coils 23 and a secondary intensive washing action by heated water, with further heating by radiation of wall 11, so that the air discharged from the apparatus is properly heated and washed, cleaned and humidified.

To permit use of the described air conditioning and heating unit for summer and winter air conditioning, the base of the apparatus includes a chamber 28 for a cooling unit 29. This unit communicates through pipes 30, 31 with a coil 32 in tank 18 and permits cooling of the water in said tank, if so desired. In summer air conditioning gas burners 8 are shut off and cooling unit 29 effects cooling of the water in tank 18, effecting by its contact with wall 9 lowering of the temperature in chamber 4 and by the water in tank 18, when circulated through coils 23, lowering of the temperature in air washing chamber 6.

The air conditioning and heating apparatus 33 shown in Figs. 5 and 6 principally corresponds to the apparatus disclosed in Figs. 1 through 4. Apparatus 33 embodies as source of heat energy an oil furnace 34 with an elongated combustion chamber 35 extended around centrally positioned air washing chamber 36 to flue pipe 37 of furnace 34. The elongated combustion chamber is separated from preheating chamber 38 and air washing chamber 36 by walls 39 and 40 to effect proper heating of both, preheating chamber 38 and air washing chamber 36. As operation of air conditioning and heating apparatus 33 is similar to the operation of air conditioning and heating apparatus 2, further description thereof is not deemed necessary.

Having thus described my invention, what I claim is:

1. In a combined air conditioning and heating apparatus an inner shell, air washing means in said shell, an outer shell encompassing said inner shell forming with the wall thereof a chamber jacketing said inner shell, a heating unit arranged in the bottom portion of said chamber, a water tank of tubular cross section arranged in the upper portion of said chamber to be heated by radiation of said heating unit pipe means connecting said water tank with said air washing means and with a source of water supply, a casing encompassing said outer shell forming with the wall thereof a second chamber jacketing said first chamber, an inlet means at the top of said second chamber, and a blower having an inlet communicating with the bottom of said second chamber and an outlet communicating with the bottom of said inner shell.

2. In a combined air conditioning and heating apparatus an inner shell, air washing means in said shell, an outer shell encompassing said inner shell and forming with the wall thereof a chamber jacketing said inner shell, a heating unit arranged in the bottom portion of said chamber, a water tank in the upper portion of said chamber in communication with said air washing means, a coil arrangement in said inner shell, pipe means connecting said water tank with said coil arrangement, pump means to circulate the water of said tank through said coil arrangement, a casing encompassing said outer shell and forming with the wall thereof a second chamber jacketing said outer shell, air inlet means at the top of said second chamber, and a blower having an inlet communicating with the bottom of said second chamber and air outlet communicating with the top of said inner shell.

3. In a combined air conditioning and heating apparatus an inner shell, water spray means in said shell, an outer shell encompassing said inner shell and forming with the wall thereof a chamber jacketing said inner shell, heating means arranged at the bottom of said chamber, a water tank of tubular cross section in the upper portion of said chamber pipe means connecting said water tank with said water spray means and a source of water supply for feeding water into said tank, a casing encompassing said outer shell and forming with the wall thereof a second chamber jacketing said first chamber, air inlet means at the top of said second chamber, and a blower below said inner shell having an inlet communicating with the bottom of said second chamber and an outlet communicating with the top of said inner shell.

4. In an air conditioning unit the combination of an air circulating apparatus having an inner shell encompassed by an outer shell and by a casing to provide two chambers encircling said inner shell, the outer one of said chambers including at its top air inlet means, a blower connecting the bottom portion of said outer chamber with the inner shell, said blower, having its intake communicating with said outer chamber and its outlet communicating with the bottom of said inner shell, a water circulating arrangement associated with said apparatus and embodying a water tank arranged in the upper portion of the inner one of said chambers, coil means arranged within said inner shell, a pump, and pipe means connecting said water tank, coil means and pump with each other for forced circulation of water in said water circulating arrangement.

5. In a combined air conditioning and heating unit, the combination of an air circulating apparatus, a water circulating arrangement associated with said air circulating apparatus, and a heating unit for both said apparatus and arrangement, said air circulating apparatus including an inner shell, encompassed by an outer shell and a casing to provide two chambers encircling said inner shell, the outer one of said chambers including at its top an inlet and being at its bottom connected with said inner shell by means of a blower having an intake communicating with the bottom of said outer one of said chambers and an outlet communicating with said inner shell, said water circulating arrangement including a water tank arranged in the upper portion of said inner one of said chambers, a coil within said inner shell, a pump, and piping connected to said tank, coil and pump so as to effect forced circulation in said water circulating arrangement, and said heating unit being mounted on the bottom wall of the inner one of said chambers.

6. In a combined air conditioning and heating apparatus such as described in claim 5, wherein said water circulating arrangement includes water spraying means arranged in the piping of said water circulating arrangement in the upper portion of said inner shell.

JOHN G. CADUFF.

REFERENCES CITED

The following references are of record in the file of this patent:

UNITED STATES PATENTS

| Number | Name | Date |
|---|---|---|
| 601,115 | Bair | Mar. 22, 1898 |
| 724,781 | Beale | Apr. 7, 1903 |
| 724,918 | McAuley | Apr. 7, 1903 |
| 1,047,765 | Derby | Dec. 17, 1912 |
| 1,731,432 | Moore | Oct. 15, 1929 |
| 2,017,621 | Grazier | Oct. 15, 1935 |
| 2,113,739 | Newman | Apr. 12, 1938 |
| 2,191,885 | Hall | Feb. 27, 1940 |
| 2,387,437 | Goggin | Oct. 23, 1945 |
| 2,388,969 | Hess | Nov. 13, 1945 |